United States Patent
Mucciacciaro

[19]

[11] Patent Number: 5,847,646
[45] Date of Patent: Dec. 8, 1998

[54] BRAKE WARNING LIGHT

[76] Inventor: Mario Mucciacciaro, 518 Church Ave., Woodmere, N.Y. 11598-2804

[21] Appl. No.: 873,510

[22] Filed: Jun. 12, 1997

[51] Int. Cl.$^6$ ....................................................... B60Q 1/44
[52] U.S. Cl. .......................... 340/479; 340/471; 340/485; 340/469
[58] Field of Search ................................. 340/479, 471, 340/485, 463–469; 362/80.1

[56] References Cited

U.S. PATENT DOCUMENTS

| | | | |
|---|---|---|---|
| D. 282,010 | 12/1985 | Ferenc | D26/28 |
| D. 316,153 | 4/1991 | Lyons | D26/28 |
| 3,603,840 | 9/1971 | DuNecher | 315/82 |
| 3,613,076 | 10/1971 | Ballou | 340/471 |
| 3,641,491 | 2/1972 | Bath | 340/469 |
| 3,678,457 | 7/1972 | Lev | 340/463 |
| 4,127,844 | 11/1978 | Purdy | 340/471 |
| 4,550,305 | 10/1985 | Bookbinder | 340/479 |
| 4,682,146 | 7/1987 | Friedman, III | 340/479 |
| 5,510,763 | 4/1996 | Deckard et al. | 340/431 |

*Primary Examiner*—Donnie L. Crosland
*Attorney, Agent, or Firm*—David L. Volk

[57] ABSTRACT

A substantially rectangular housing includes a broad planar face which includes a stenciled warning therein, such as "SLOW DOWN". A colored, transparent plate is disposed immediately behind the face. A strobe light and at least one lamp are contained within the housing behind the face and the plate. A circuit within the housing is adapted to be electrically connected in a known manner to the brake system of an automobile. The brake light is adapted for connection to an automobile. The circuit is configured in a known manner to activate the lamp in a steady manner when a driver applies the brakes of the automobile, as indicated through the brake system. If the brakes remain applied for a first pre-determined time period, for example 2 seconds, the strobe light will activate in a flashing manner. The strobe light will deactivate after a second pre-determined time period, for example 4 seconds. If at any time the brakes are released, both the strobe light and the lamp will be deactivated.

4 Claims, 2 Drawing Sheets

BRAKE WARNING LIGHT

BACKGROUND OF THE INVENTION

1. Field of the Invention

The present invention relates to automobile warning light systems, particularly to brake warning lights.

2. Description of the Related Art

Automobile accidents occur frequently throughout the United States. Many are rear end collisions, which could be avoided if the trailing driver could be made more immediately aware of the sudden slowing or stopping of the vehicle in front. Any warning system should be configured to convey a sense of urgency to encourage a rapid reaction by the trailing driver.

SUMMARY OF THE INVENTION

The brake warning light of the present invention includes a substantially rectangular housing having a broad planar face which includes a stenciled warning therein, such as "SLOW DOWN". A colored, transparent plate is disposed immediately behind the face. A strobe light and at least one lamp are contained within the housing behind the face and the plate. A circuit means within the housing is adapted to be electrically connected in a known manner to the brake system of an automobile. A connection means is provided on the brake warning light for connection to the automobile.

The circuit means is configured in a known manner to activate the lamp in a steady manner when a driver applies the brakes of the automobile, as indicated through the brake system. If the brakes remain applied for a first pre-determined time period, for example 2 seconds, the strobe light will activate in a flashing manner. The strobe light will deactivate after a second pre-determined time period, for example 4 seconds. If at any time the brakes are released, both the strobe light and the lamp will be deactivated.

Because of the stenciled warning, drivers are more likely to sense the urgency of the situation upon activation of the brake warning light.

Because of the strobe light which flashes after a first pre-determined time period, the trailing driver will sense greater urgency when the lead vehicle continues to slow down.

Because the strobe light ceases after a second pre-determined time period, it will not flash so long as to become annoying or distracting.

Still further features and advantages will become apparent from the ensuing description and drawings.

DETAILED DESCRIPTION

Figure 1:
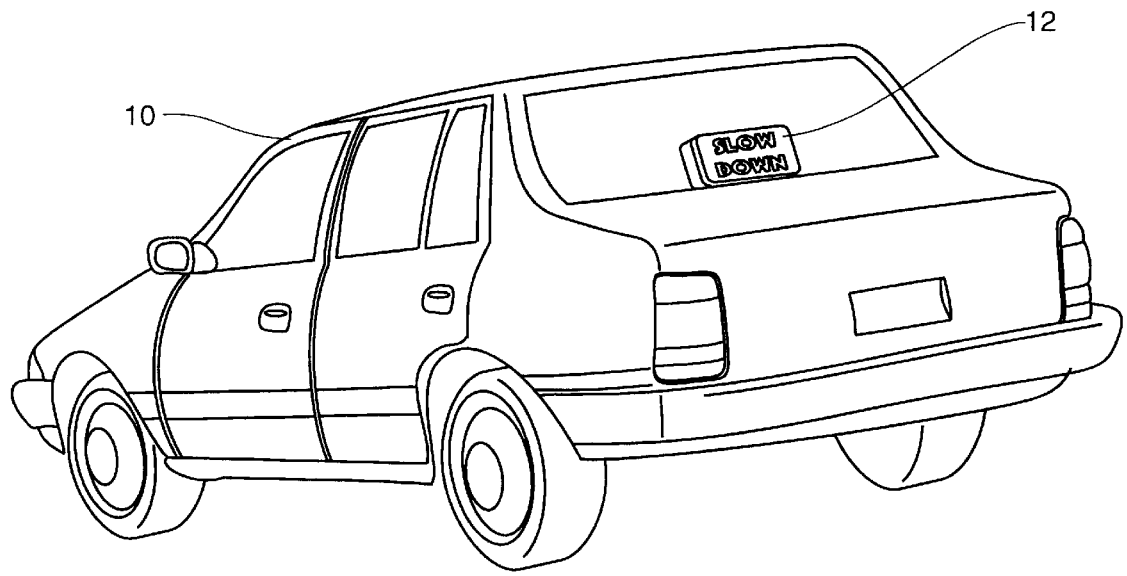
FIG. 1 is a perspective view of an automobile using a brake warning light of the present invention.

FIG. 1 is a perspective view of an automobile 10 using a brake warning light 12 of the present invention. Although the brake warning light 12 is shown in the location of the conventional third brake light, the brake warning light 12 may be positioned in any suitable location, such as adjacent the third brake light, above the license plate, or near or on the bumper of the automobile 10.

Figure 2:
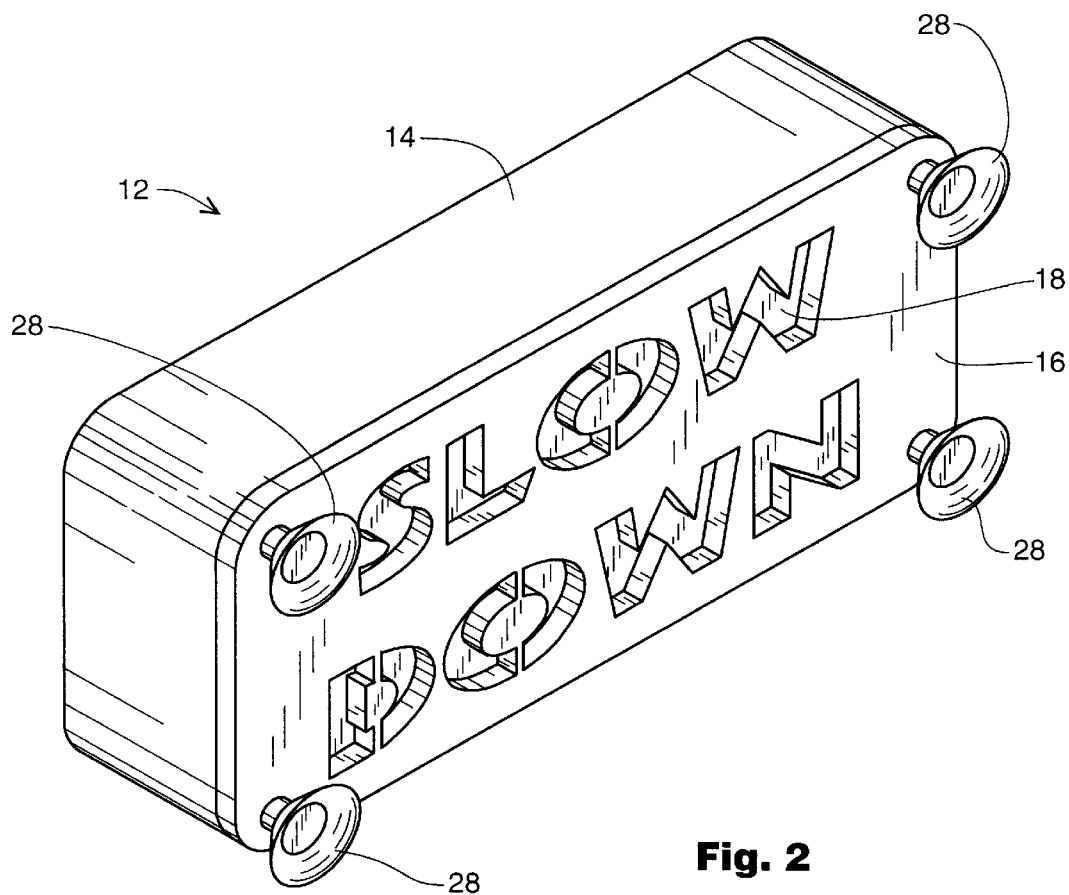
FIG. 2 is a perspective view of the brake warning light.
Figure 3:
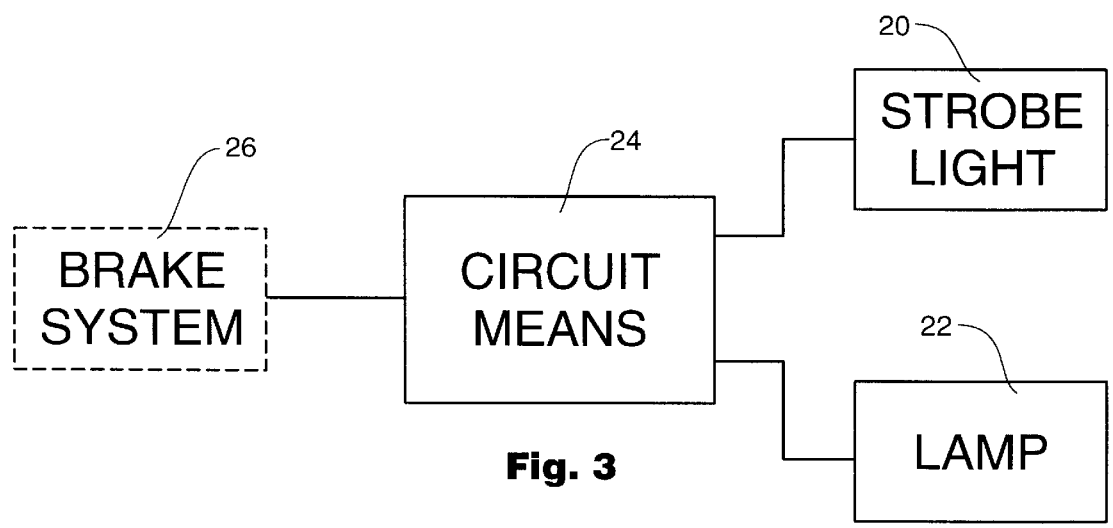
FIG. 3 is a block schematic diagram thereof.

FIG. 2 is a perspective view of the brake warning light 12, and FIG. 3 is a block schematic diagram thereof. Referring to FIGS. 2 and 3, the brake warning light 12 includes a substantially rectangular housing 14 having a broad planar face 16 which includes a stenciled warning therein, such as "SLOW DOWN". A colored, transparent plate 18 is disposed immediately behind the face 16. A strobe light 20 and at least one lamp 22 are contained within the housing 14 behind the face 16 and the plate 18. A circuit means 24 within the housing 14 is adapted to be electrically connected in a known manner to the brake system 26 of the automobile 10. A connection means 28 is provided on the warning light 12 for connection to the automobile. As shown, the connection means 28 comprises suction cups on the face 16 of the housing 14, for attachment to a rear window of the automobile 10. It is within the scope of the invention that any suitable connection means 28 may be provided.

The circuit means 24 is configured in a known manner to activate the lamp 22 in a steady manner when a driver applies the brakes (not shown) of the automobile 10, as indicated through the brake system 26. If the brakes remain applied for a first pre-determined time period, for example 2 seconds, the strobe light 20 will activate in a flashing manner. The strobe light 20 will deactivate after a second pre-determined time period, for example 4 seconds. If at any time the brakes are released, both the strobe light 20 and the lamp 22 will be deactivated. The circuit means 24 will then reset to repeat the above sequence the next time the brakes are applied.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A brake warning light adapted for positioning on a vehicle and for electrical connection to a brake system of the vehicle, the brake warning light comprising:
   a. a housing including a display means;
   b. a strobe light and at least one lamp within the housing and behind the display means, and positioned to shine through the display means;
   c. a circuit means within the housing, the circuit means configured to:
      i. activate the lamp in a steady manner when brakes of the vehicle are applied;
      ii. activate the strobe light in a flashing manner at the end of a first pre-determined time period during which the brakes remain applied; and
      iv. deactivate the strobe light and the lamp when the brakes are released.

2. A brake warning light adapted for positioning on a vehicle and for electrical connection to a brake system of the vehicle, the brake warning light comprising:
   a. a housing including a display means;
   b. a strobe light and at least one lamp within the housing and behind the display means, and positioned to shine through the display means;
   c. a circuit means within the housing, the circuit means configured to:
      i. activate the lamp in a steady manner when brakes of the vehicle are applied;
      ii. activate the strobe light in a flashing manner at the end of a first pre-determined time period during which the brakes remain applied;

iii. deactivate the strobe light at the end of a second pre-determined time period during which the brakes remain applied;
iv. deactivate the strobe light and the lamp when the brakes are released; and
v. each time the brakes are released, reset to repeat steps i. through iv. when the brakes are applied again.

3. The brake warning light of claim 2, wherein the display means comprises a colored, transparent plate behind a face piece, the face piece having a stenciled message therein.

4. The brake warning light of claim 3, wherein the message reads "SLOW DOWN."

* * * * *